United States Patent [19]
Tracy et al.

[11] 4,240,696
[45] Dec. 23, 1980

[54] MULTILAYER ELECTRO-OPTICALLY TUNABLE FILTER

[75] Inventors: John M. Tracy; Pochi A. Yeh, both of Thousand Oaks, Calif.

[73] Assignee: Rockwell International Corporation, El Segundo, Calif.

[21] Appl. No.: 93,362

[22] Filed: Nov. 13, 1979

[51] Int. Cl.³ .............................................. G01B 27/00
[52] U.S. Cl. ..................... 350/163; 350/1.6; 350/150; 350/355
[58] Field of Search ............... 350/1.6, 1.7, 150, 163, 350/164, 166, 292, 355, 356, 357

[56] References Cited
U.S. PATENT DOCUMENTS

| 2,493,200 | 1/1950 | Land | 350/150 |
| 3,427,092 | 2/1969 | Smith | 350/166 |

OTHER PUBLICATIONS

Yeh et al., "Electromagnetic Propagation in Periodic Stratified Media", 67 J. Opt. Soc. Am. 423 (1977).

Primary Examiner—R. A. Rosenberger
Attorney, Agent, or Firm—H. Fredrick Hamann; Craig O. Malin; John J. Deinken

[57] ABSTRACT

Disclosed is an optical filter, including a plurality of adjacent layer pairs, each pair having an incident and an emergent surface and including a first dielectric layer having a thickness t and a refractive index n, a second dielectric layer, adjacent to the first layer, having a thickness t and a refractive index n, and a control electrode disposed between and in electrical contact with the layers. The filter further includes a plurality of ground electrodes disposed on the layer pairs to electrically contact each incident and emergent surface, a source of electric potential, and a switch for connecting the source between the control electrodes and the ground electrodes, whereby light having a wavelength $\lambda = 4nt$ will be reflected by the filter upon closing the switch and thereby applying the electric potential in opposite directions across the first and second layer pairs. The plurality of layer pairs may include m layer pairs, with the thickness of each dielectric layer in the ith pair (i=1, 2, 3 ... m) being $t_i$, such that $nt_i = \lambda_i/4$, the filter thereby being adapted to reflect light having wavelength in the range $\lambda_1, \lambda_2, \lambda_3 ... \lambda_m$.

9 Claims, 7 Drawing Figures

MULTILAYER ELECTRO-OPTICALLY TUNABLE FILTER

BACKGROUND OF THE INVENTION

This invention relates to the field of optical devices and, more particularly, to tunable optical filters.

In many applications of optical technology, it is necessary to isolate a particular wavelength or band of wavelengths from incident light containing a broad band of wavelengths. In the field of infrared detection, for example, a typical target object, such as an airborne vehicle, commonly will emit a characteristic infrared radiation spectrum containing features which are unique to that particular type of vehicle, such as one or more peak amplitudes at particular wavelenths in the spectrum. Consequently, it is essential to provide a detection apparatus with the capability of filtering incident light to obtain a signal with a narrow bandwidth centered about one or more specific wavelengths and with a high rejection for the off-band portions of the received light. Another typical application where such a filtering device is needed is in optical communications, where a carrier optical beam may be multiplexed with a plurality of different signals, each modulating a different frequency within the beam spectrum. A narrow band filter must be utilized to separate information contained on a particular wavelength from the remainder of the carrier beam.

One approach toward achieving the desired type optical filtering is to mechanically introduce a light filtering material into the path of an incoming optical beam, the characteristics of the particular material used then determining the wavelength or band of wavelenths which will be removed from the beam. Such mechaical systems, however, are undesirable since they are inherently slow in responding to changes in the transmitted signal. Thus, it is frequently desirable to utilize a system which may be adjusted, or turned, very rapidly. One class of devices which satisfies this requirement is optical filters whose transmission characteristics may be controlled by the application of an electric potential to the filter. Such filters have been used in a variety of applications, such as optical signal processing, high resolution spectroscopy, solar physics, astrophysics, high pressure tunable lasers, and infrared focal plane technology.

Unfortunately, however, a tradeoff commonly occurs in optical filter design between high resolution and large angular aperture capabilities, that is, when a filter is designed to provide a narrow pass band, that filter tends to function only for a relatively more narrow angle of incident light. Thus, a need has developed in the art for an electronically tunable optical filter exhibiting high resolution and operating over a wide angular aperture.

SUMMARY OF THE INVENTION

It is a general object of this invention to provide a new and improved optical filter. The inventors have combined the principles of Bragg reflection with the properties of electro-optic materials to achieve a versatile filter design which may be advantageously applied to a number of important areas of technology.

An optical filter, according to the present invention, includes a plurality of adjacent layer pairs, each pair having an incident and emergent surface and including a first dielectric layer with a refractive index n, a second dielectric layer with a refractive index n, adjacent to the first layer, the layers having the same thickness, and a control electrode disposed between and in electrical contact with the layers. The filter further includes a plurality of ground electrodes disposed on the layer pairs so that a ground electrode is in electrical contact with the incident and emergent surfaces of each layer pair. Light traversing the filter may be controlled by the application of an electric potential between the control electrodes and the ground electrodes so that the filter will selectively reflect light at a wavelength $\lambda$, where $\lambda = 4nt$, t being the thickness of the layers.

In a more particular embodiment, the control and ground electrodes are doped conductive layers in the first and second dielectric layers. The filter may further include a source of electric potential and a switch for connecting the source between the control electrodes and the ground electrodes.

In another more particular embodiment, the optical filter of this invention includes m adjacent layer pairs graduated in thickness, each pair having an incident and an emergent surface, the ith pair (i = 1, 2, 3 ... m) including a first dielectric layer having a thickness $t_i$ and a refractive index n, a second dielectric layer with a refractive index n, adjacent to the first layer, the layers having the same thickness, and a control electrode disposed between and in electrical contact with the layers. The filter additionally includes a plurality of ground electrodes disposed on the layer pairs to electrically contact each incident and emergent surface, a source of electric potential, and a switching means for independently connecting the source between each of the control electrodes and the ground electrodes. In this manner, light having a wavelength $\lambda_i = 4nt_i$ will be reflected by the filter when the potential is applied to the ith layer pair and to a suitable number of neighboring layer pairs.

These examples of the more important features of the invention have been broadly outlined in order to facilitate an understanding of the detailed description that follows and so that the contributions which this invention provides to the art may be better appreciated. There are, of course, additional features of the invention, which will be further described below and which are included within the subject matter of the appended claims.

BRIEF DESCRIPTION OF THE DRAWINGS

Additional objects, features, and advantages of the present invention will become apparent by referring to the detailed description below of the preferred embodiments in connection with the accompanying drawings, wherein like reference numbers refer to like elements throughout all the figures. In the drawings.

DESCRIPTION OF THE PREFERRED EMBODIMENTS

Periodic optical media, and specifically stratified periodic structures, play an important role in a number of optical applications. Such devices, for example, have been utilized as multi-layer, high reflectance coatings, for both high reflection and anti-reflection, for phase matching in nonlinear optical applications, and for obtaining optical birefringence in stratified media composed of isotropic or cubic materials. Furthermore, recent developments in crystal growing technology, especially in molecular beam technology, have made possible the growth of multilayer media with well controlled periodicities and with layer thicknesses as small as 10 Å. As a result of these developments, the periodic optical structure may be considered a new optical medium akin to homogeneous isotropic and anistropic materials. Such a periodic structure has been employed in the present invention to provide a new optical filter which takes advantage of the Bragg reflection principle.

Figure 1:
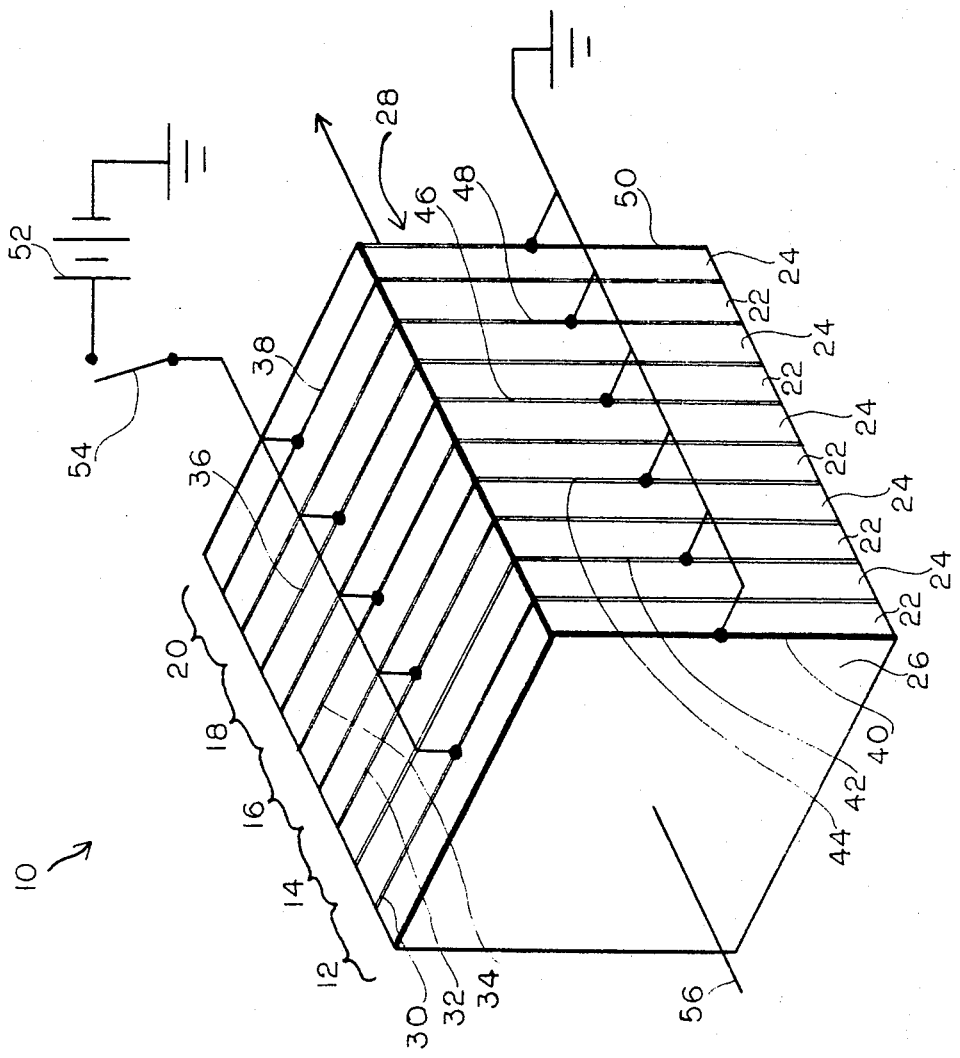
FIG. 1 is a perspective, partially schematic view illustrating a filter built according to the present invention.

Referring now to FIG. 1, an embodiment of the present invention is illustrated in a perspective, partially schematic view. In FIG. 1, the optical filter 10 is fabricated from five adjacent layer pairs 12, 14, 16, 18, and 20. Each pair includes a first dielectric layer 22 and a second dielectric layer 24, which are equal in thickness and have the same refractive index. Each first dielectric layer defines an incident surface 26 for each layer pair, (the first incident surface is indicated), while an emergent surface 28 (the last emergent surface being indicated) is defined by the second dielectric layers. Disposed between each pair of layers is one of the control electrodes 30, 32, 34, 36, and 38, each control electrode being in electrical contact with its adjacent layers. The structure of the filter is completed by the ground electrodes 40, 42, 44, 46, 48, and 50, which are positioned so that electrical contact is established between a ground electrode and each incident and emergent surface of each layer pair. The control and ground electrodes may be provided, for example, by doping a conductive substance into the surfaces of each dielectric layer. Other electrode structures may also be suitable for this filter, including thin metal films, transparent conductive films, and semiconducting films. Whatever type of electrode is utilized, it is important that the electrodes be sufficiently transparent to the wavelengths of interest.

A source of electric potential is provided by a battery 52, which may be connected across the layer pairs by means of the control and ground electrodes and a switch 54. When the electric potential is not applied to the filter, incoming light, represented by the arrow 56, may pass through the filter unobstructed. When the switch 54 is closed, however, the applied potential causes the refractive indices of the layers in the filter to alternately increase and decrease, thereby creating an optically periodic structure which reflects light at a particular wavelength, as further explained below, by the principle of Bragg reflection.

To further explain the operation of this invention, it will be helpful to examine generally the nature of electromagnetic wave propagation in a periodic medium. Consider a stratified medium consisting of alternating layers having different indices of refraction. The index of refraction profile is given by:

$$n(x) = \begin{cases} n_2, & 0 < x < b \\ n_1, & b < x < \Lambda \end{cases} \quad (1)$$

with $n(x+\Lambda) = n(x)$, where the x axis is normal to the layer interfaces and $\Lambda$ is the period. The distribution of typical field components can then be written:

$$E(x,z) = E(x)e^{i\beta z} \quad (2)$$

The electric field distribution within each homogeneous layer can be expressed as a sum of an incident plane wave and a reflected plane wave, with the complex amplitudes of these two waves constituting the components of a column vector. The electric field in the $\alpha$ ($\alpha = 1, 2$) layer of the nth unit cell can thus be represented by a column vector:

$$\begin{pmatrix} a_n^{(\alpha)} \\ b_n^{(\alpha)} \end{pmatrix} \quad (3)$$

As a result, the electric field distribution in the same layer can be written:

$$E(x,z) = [a_n^{(\alpha)} e^{ik_{\alpha x}(x-n\Lambda)} + b_n^{(\alpha)} e^{-ik_{\alpha x}(x-n\Lambda)}] e^{i\beta z} \quad (4)$$

where $$k_{\alpha x} = \{[(w/c) n_\alpha]^2 - \beta^2\}^{\frac{1}{2}} \quad (5)$$

The column vectors in Equation 3 are not independent of each other, but are related through the continuity conditions at the interfaces. In the case of TE modes (with the E vector in the y-z plane), imposing the conditions of continuity of E and $(\partial E/\partial x)$ at the interface and converting to a matrix form leads to the equation:

$$\begin{pmatrix} a_{n-1} \\ b_{n-1} \end{pmatrix} = \begin{pmatrix} A & B \\ C & D \end{pmatrix} \begin{pmatrix} a_{n-1} \\ b_{n-1} \end{pmatrix} \quad (6)$$

where the matrix elements are:

$$A = e^{-ik_{1x}a} \left[ \cos k_{2x}b - \tfrac{1}{2}i\left(\frac{k_{2x}}{k_{1x}} + \frac{k_{1x}}{k_{2x}}\right) \sin k_{2x}b \right]$$

$$B = e^{ik_{1x}a} \left[ -\tfrac{1}{2}i\left(\frac{k_{2x}}{k_{1x}} - \frac{k_{1x}}{k_{2x}}\right) \sin k_{2x}b \right]$$

$$C = e^{-ik_{1x}a} \left[ \tfrac{1}{2}i\left(\frac{k_{2x}}{k_{1x}} - \frac{k_{1x}}{k_{2x}}\right) \sin k_{2x}b \right]$$

$$D = e^{ik_{1x}a} \left[ \cos k_{2x}b + \tfrac{1}{2}i\left(\frac{k_{2x}}{k_{1x}} + \frac{k_{1x}}{k_{2x}}\right) \sin k_{2x}b \right]$$

For TM waves (with the H vector in the y-z plane) the matrix elements (A, B, C, D) are similar in form to those above. The matrix in Equation 6 is the unit cell translation matrix, which relates the complex amplitudes of the incident plane wave $a_{n-1}$ and the reflected plane wave $b_{n-1}$ in one layer of a unit cell to those of the equivalent layer in the next unit cell.

As was noted above, only one column vector is independent. It can be chosen, or example, as the column vector of the $n_1$ layer in the zeroth unit cell. The remaining column vectors of the equivalent layers are then given as:

$$\begin{pmatrix} a_n \\ b_n \end{pmatrix} = \begin{pmatrix} A & B \\ C & D \end{pmatrix}^{-n} \begin{pmatrix} a_o \\ b_o \end{pmatrix} \qquad (7)$$

This derivation is explained in further detail in Yeh, Yariv, and Hong, Electromagnetic Propagation in Periodic Stratified Media, 67 J. Opt. Soc. Am. 423 (1977), the teaching of which is incorporated herein by reference.

The above derivation may be applied to the phenomenon of Bragg reflection by considering a periodically stratified medium having N unit cells. The coefficient of reflection is given by:

$$\gamma_N = \left(\frac{b_o}{a_o}\right)_{b_n} = 0 \qquad (8)$$

Equation 7 provides the following relation:

$$\begin{pmatrix} a_o \\ b_o \end{pmatrix} = \begin{pmatrix} A & B \\ C & D \end{pmatrix}^N \begin{pmatrix} a_N \\ b_N \end{pmatrix} \qquad (9)$$

The Nth power of a unimodular matrix can be simplified using the identity:

$$\begin{pmatrix} A & B \\ C & D \end{pmatrix}^N = \begin{pmatrix} A\ U_{N-1} - U_{N-2} & B\ U_{N-1} \\ C\ U_{N-1} & D\ U_{N-1} - U_{N-2} \end{pmatrix} \qquad (10)$$

Where:

$U_N = \mathrm{Sin}\ (N+1)K\Lambda/\mathrm{Sin}\ K\Lambda$
$K(\beta,w) = (1/\Lambda)\ \mathrm{Cos}^{-1}\ [\frac{1}{2}(A+D)]$ The coefficient of reflection then becomes:

$$\gamma_N = C\ U_{N-1}/(AU_{N-1} - U_{N-2}) \qquad (11)$$

The reflectivity is obtained by taking the absolute square:

$$|\gamma_N|^2 = \frac{|C|^2}{|C|^2 + (\mathrm{Sin}\ K\Lambda/\mathrm{Sin}\ NK\Lambda)^2} \qquad (12)$$

The term $|C|^2$ is directly related to the reflectivity of a single unit cell by:

$$|\gamma_1|^2 = |C|^2/(|C|^2 + 1) \qquad (13)$$

Figure 2:
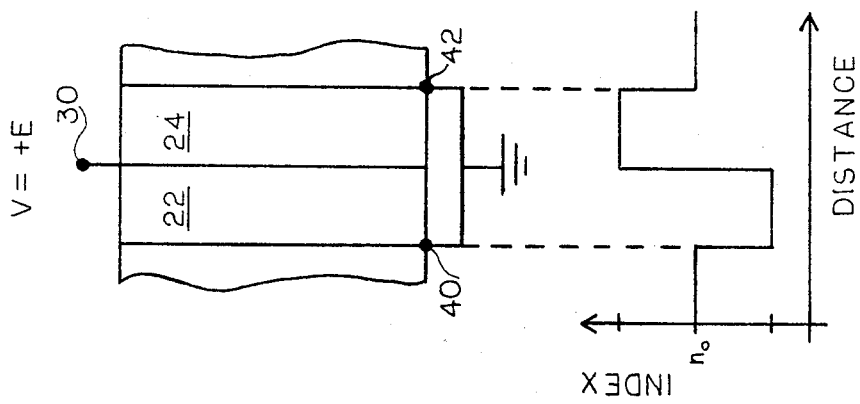
FIG. 2 is a schematic side view of one unit cell in the filter shown in FIG. 1, together with an associated plot of the refractive index profile of the unit cell in the presence of an applied electric potential.
Figure 3:
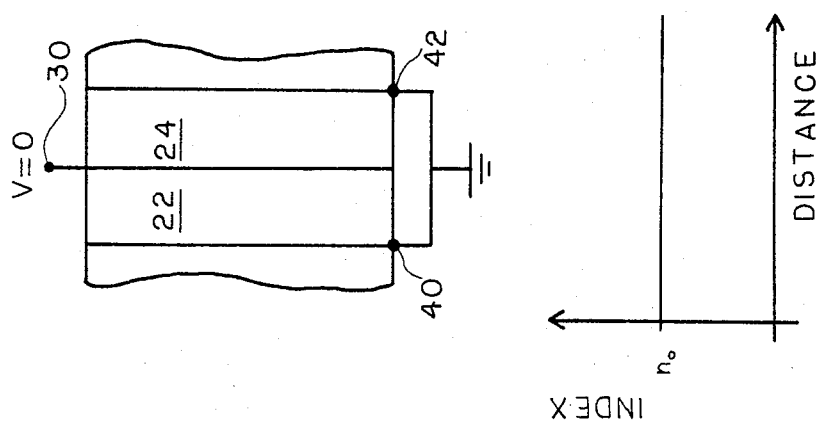
FIG. 3 is similar to FIG. 2 but illustrates the condition of the unit cell in the absence of an applied potential.

The above analysis may be related to the operation of the filter of the present invention by reference to FIGS. 2 and 3, FIG. 2 being a schematic side view of one unit cell from the filter 10, together with an associated plot of the refractive index profile in the presence of an applied electric potential, while FIG. 3 is similar to FIG. 2 but indicates the condition of the unit cell in the absence of an applied potential.

By applying a voltage E to the control electrode 30 relative to the ground electrodes 40 and 42, electric fields of opposite directions are created in the layers 22 and 24. Because of the electro-optic effect, the refractive index profile is altered, as shown in FIG. 2, creating a pair of quarter wave layers so that the structure acts like a reflector for light of wavelength $$\lambda = 4\ n_o l \qquad (14)$$

Although there is only a small change $\pm \Delta n/2$ in the refractive index of each layer, this change is enough so that the unit cell effectively operates as a quarter wave plate for light of the wavelength $\lambda$. It is necessary that the electro-optic material used for the layers 22 and 24 be sufficiently non-conducting to ensure that the electric field applied across the electrodes will be maintained in the bulk of the material.

When the voltage is turned off, as shown in FIG. 3, a single half wave layer is obtained and the structure operates to transmit all of the incident light. As shown in FIG. 1, this unit cell can be repeated in a multi-layer structure to create a very effective narrowband electronic shutter. The entire structure then operates as a Bragg reflector when the voltage is turned on. The period of this reflector may be any integer multiple of the thickness of a unit cell layer pair. The number of layer pairs which will be required in a particular application will be dependent upon the electro-optic coefficient of the material used for the layer pairs. For this reason, materials with high coefficients are desirable in this filter.

Figure 4:
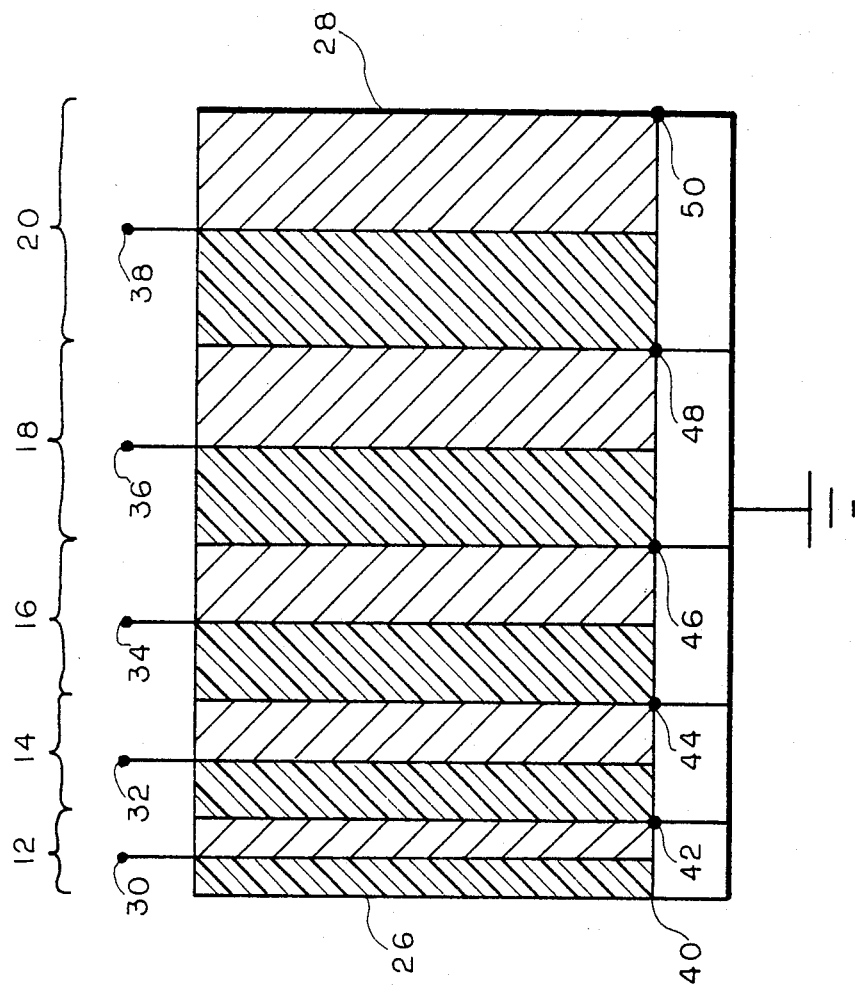
FIG. 4 provides a schematic cross-sectional side view of a "chirped" filter constructed according to the present invention.
Figure 5:
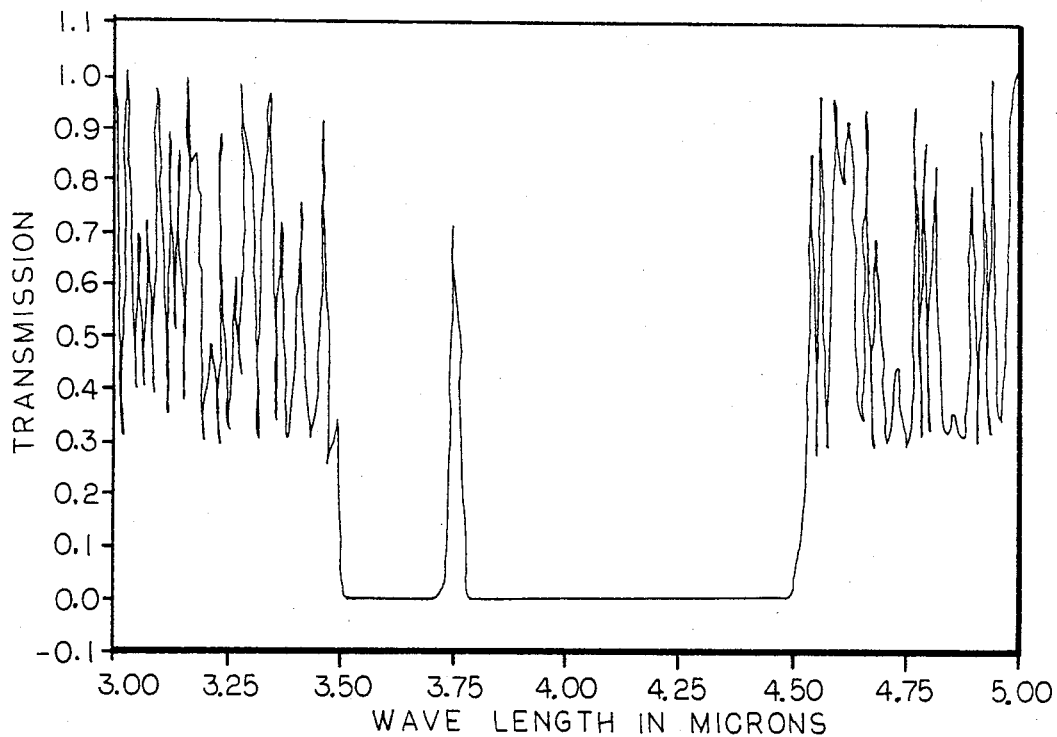
FIGS. 5, 6, and 7 are plots illustrating calculated spectral responses for one particular filter of the type illustrated in FIG. 4.
Figure 6:
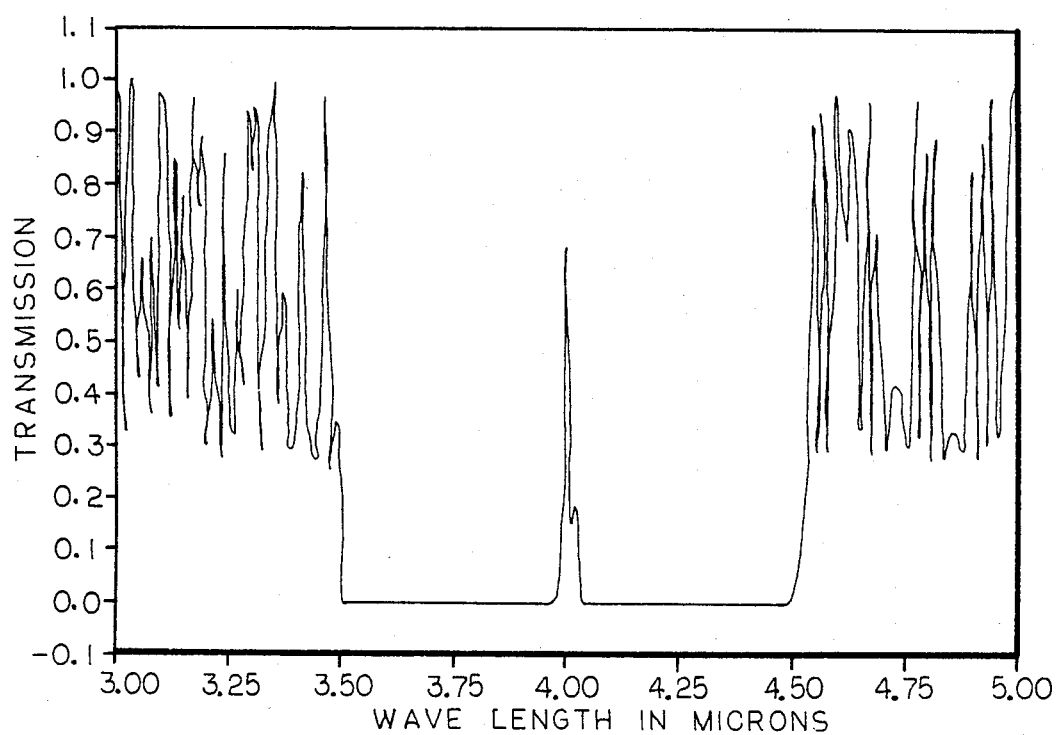
Figure 7:
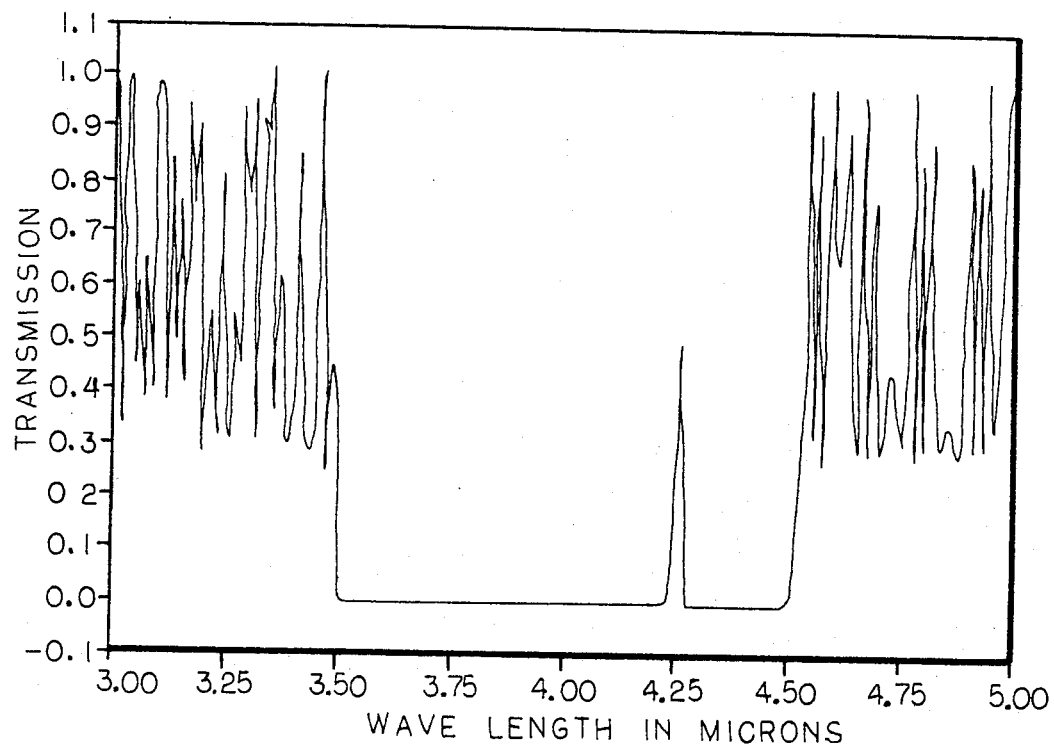

Another embodiment of a filter constructed in accordance with the present invention is illustrated in a schematic cross-sectional side view in FIG. 4. This filter is similar to that of FIG. 1, except that it employs a "chirped" multilayer stack, i.e., the layer pairs 12, 14, 16, 18, and 20 vary from a minimum thickness, for the first pair 12, to a maximum thickness for the last pair 20. Although the differences in thickness between the layer pairs are somewhat exaggerated in FIG. 4 for the purposes of illustration, in an actual device the change in thickness from one layer pair to the adjacent layer pair would be very small and the total number of layer pairs would be considerably larger. When the voltage is applied to all the control electrodes, the filter of FIG. 4 operates as a broadband reflector. If such a filter includes m layer pairs with the thickness of the ith pair ($i = 1, 2, 3 \ldots m$) being $t_i$, such that $t_i = \lambda_i/4n$, then the filter will reflect light having wavelenghs in the range $\lambda_1, \lambda_2, \lambda_3 \ldots \lambda_m$. Furthermore, if the control electrodes are each independently connectable to a source of electric potential, the pass band may be tuned electronically. The pass band of this filter structure can be made as narrow as 100 Å, while the tuning range can be a broad as desired. Calculated typical spectral responses for the use of such a filter in the infrared range are plotted in FIGS. 5, 6, and 7. In the example shown, the results were computed for a filter having 10,660 layer pairs, with a total thickness of 6283.69 Å and voltage-induced refractive indices of 3.35 and 3.40 for the first and second dielectric layers, respectively. FIGS. 5, 6, and 7 illustrate how the filter can be tuned to 3.75, 4.00, and 4.25 μm, within the bandwidth of the filter. To achieve such tuning, a number of layer pairs centered around the layer pair corresponding to the desired wavelength are activated. The number of pairs activated may be varied, depending on the desired width of the pass band. Furthermore, if all of the control electrodes are simultaneously connected to the voltage source, the filter of FIG. 4 will function as a broadband wide angular aperture modulator.

In conclusion, although typical embodiments of the present invention are discussed herein, numerous modifications and alternative embodiments of the apparatus of this invention will be apparent to those skilled in the art in view of this description. The calculated data, for example, illustrates an application of the invention in the range of infrared wavelengths, although the inventive concept is not limited to the infrared region, but may be applied to any wavelength of light, provided only that suitable electro-optic materials and electrode structures are available which are transparent in the portion of the spectrum which is of interest. Accordingly, this description is to be considered as illustrative only and is provided for the purpose of teaching those skilled in the art the manner of constructing and using the apparatus of this invention. Furthermore more, it should be understood that the forms of the invention depicted and described herein are to be considered as the presently preferred embodiments. Various changes may be made in the configurations, sizes, and arrangements of the components of the invention, as will be recognized by those skilled in the art, without departing from the scope of the invention. Equivalent elements, for example, might be substituted for those illustrated and described herein, parts or connections might be reversed or otherwise interchanged, and certain features of the invention might be utilized independently of the use of other features, all as will be apparent to one skilled in the art after receiving the benefit obtained through reading the above description of the invention.

What is claimed is:

1. An optical filter, comprising:
   a plurality of adjacent layer pairs, each pair having an incident and an emergent and including:
   a first dielectric layer with a refractive index n,
   a second dielectric layer with a refractive index n adjacent to said first layer, said layers having the same thickness, and
   a control electrode disposed between and in electrical contact with said layers; and
   a plurality of ground electrodes disposed on said layer pairs such that at least one of said ground electrodes is in electrical contact with each incident and each emergent surface,
   whereby light traversing the filter may be controlled by the application of an electric potential between said control electrodes and said ground electrodes.

2. The filter of claim 1, wherein $nt=\lambda/4$ where t is the thickness of each layer, the filter thereby being adapted to selectively reflect light having a wavelength $\lambda$.

3. The filter of claim 1, wherein said control and ground electrodes comprise doped conductive layers in said first and second dielectric layers.

4. The filter of claim 1, further comprising:
   a source of electric potential; and
   a switch for connecting said source between said control electrodes and said ground electrodes.

5. The filter of claim 1, wherein said layer pairs vary from a minimum to a maximum thickness, the filter thereby being adapted to operate as a broadband reflector upon the application of said electric potential.

6. The filter of claim 5, wherein said plurality of layer pairs comprises m layer pairs, with the thickness of each dielectric layer in the ith pair (i=1, 2, 3 ... m) being $t_i$, such that $$nt_i = \lambda_i/4,$$

the filter thereby being adapted to reflect light having wavelengths in the range $\lambda_1, \lambda_2, \lambda_3 \ldots \lambda_m$.

7. The filter of claim 6, further comprising:
   a source of electric potential; and
   a control switch for independently connecting said source between said ground electrodes and each of said control electrodes,
   said filter thereby being tunable within the range of wavelengths from $\lambda_1$ to $\lambda_m$.

8. An optical filter, comprising:
   a plurality of adjacent layer pairs, each pair having an incident and an emergent surface and including:
   a first dielectric layer having a thickness t and a refractive index n,
   a second dielectric layer, adjacent to said first layer, having a thickness t and a refractive index n, and
   a control electrode disposed between and in electrical contact with said layers; and
   a plurality of ground electrodes disposed on said layer pairs to electrically contact each incident and emergent surface;
   a source of electric potential; and
   a switch for connecting said source between said control electrodes and said ground electrodes,
   whereby light having a wavelength $\lambda = 4nt$ will be reflected by the filter upon closing said switch and thereby applying said electric potential in opposite directions across said first and second layer pairs.

9. An optical filter, comprising:
   m adjacent layer pairs graduated in thickness, each pair having an incident and an emergent surface, the ith pair (i=1, 2, 3 ... m) including:
   a first dielectric layer having a thickness $t_i$ and a refractive index n,
   a second dielectric layer, adjacent to said first layer, having a thickness $t_i$ and a refractive index n, and
   a control electrode disposed between and in electrical contact with said layers;
   a plurality of ground electrodes disposed on said layer pairs to electrically contact each incident and emergent surface;
   a source of electric potential; and
   switching means for independently connecting said source between each of said control electrodes and said ground electrodes,
   whereby light having a wavelength $\lambda_i = 4nt_i$ will be reflected by said filter when said potential is applied to said ith layer pair.

* * * * *